United States Patent
Kleijn et al.

(10) Patent No.: US 12,242,567 B2
(45) Date of Patent: Mar. 4, 2025

(54) IDENTIFYING SALIENT FEATURES FOR GENERATIVE NETWORKS

(71) Applicant: Google LLC, Mountain View, CA (US)

(72) Inventors: Willem Bastiaan Kleijn, Eastborne Wellington (NZ); Sze Chie Lim, San Francisco, CA (US); Michael Chinen, El Cerrito, CA (US); Jan Skoglund, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1053 days.

(21) Appl. No.: 17/250,506

(22) PCT Filed: May 16, 2019

(86) PCT No.: PCT/US2019/032665
§ 371 (c)(1),
(2) Date: Jan. 29, 2021

(87) PCT Pub. No.: WO2020/231437
PCT Pub. Date: Nov. 19, 2020

(65) Prior Publication Data
US 2021/0287038 A1 Sep. 16, 2021

(51) Int. Cl.
*G06N 3/045* (2023.01)
*G06F 18/2113* (2023.01)
(Continued)

(52) U.S. Cl.
CPC ........ *G06F 18/213* (2023.01); *G06F 18/2113* (2023.01); *G06N 3/045* (2023.01); *G06N 3/08* (2013.01); *G06N 3/088* (2013.01)

(58) Field of Classification Search
CPC ... G06F 18/213; G06F 18/2113; G06N 3/045; G06N 3/08; G06N 3/088
See application file for complete search history.

(56) References Cited

U.S. PATENT DOCUMENTS

2019/0130903 A1   5/2019   Sriram et al.
2020/0226724 A1*  7/2020   Fang ................. G06V 10/7715

FOREIGN PATENT DOCUMENTS

CN   105512273 A   4/2016
CN   107194347 A   9/2017
(Continued)

OTHER PUBLICATIONS

Pan et al., "Domain Adaptation via Transfer Component Analysis," in IEEE Transactions on Neural Networks, vol. 22, No. 2, pp. 199-210, Feb. 2011, doi: 10.1109/TNN.2010.2091281. (Year: 2011).*

(Continued)

*Primary Examiner* — Casey R. Garner
(74) *Attorney, Agent, or Firm* — Brake Hughes Bellermann LLP

(57) ABSTRACT

Implementations identify a small set of independent, salient features from an input signal. The salient features may be used for conditioning a generative network, making the generative network robust to noise. The salient features may facilitate compression and data transmission. An example method includes receiving an input signal and extracting salient features for the input signal by providing the input signal to an encoder trained to extract salient features. The salient features may be independent and have a sparse distribution. The encoder may be configured to generate almost identical features from two input signals a system designer deems equivalent. The method also includes conditioning a generative network using the salient features. In some implementations, the method may also include extracting a plurality of time sequences from the input signal and extracting the salient features for each time sequence.

21 Claims, 8 Drawing Sheets

(51) Int. Cl.
G06F 18/213 (2023.01)
G06N 3/08 (2023.01)
G06N 3/088 (2023.01)

(56) References Cited

FOREIGN PATENT DOCUMENTS

| | | |
|---|---|---|
| CN | 109741736 A | 5/2019 |
| TW | 201433153 A | 8/2014 |

OTHER PUBLICATIONS

Yu et al. "GaitGAN: Invariant Gait Feature Extraction Using Generative Adversarial Networks," 2017 IEEE Conference on Computer Vision and Pattern Recognition Workshops (CVPRW), Honolulu, Hi, USA, 2017, pp. 532-539, doi: 10.1109/CVPRW.2017.80. keywords: {Gallium nitride (Year: 2017).*
Al-Marridi et al., "Convolutional Autoencoder Approach for EEG Compression and Reconstruction in m-Health Systems," 2018 14th International Wireless Communications & Mobile Computing Conference (IWCMC), Limassol, Cyprus, 2018, pp. 370-375, doi: 10.1109/IWCMC.2018.8450511. (Year: 2018).*
O'Grady et al., "Survey of sparse and non-sparse methods in source separation. International Journal of Imaging Systems and Technology. ", Jul. 2005, International Journal of Imaging Systems and Technology 15(1), pp. 18-33, DOI: 10.1002/ima.20035 (Year: 2005).*
Guo et al., "Deep Embedded Clustering with Data Augmentation", Nov. 2018, The 10th Asian Conference on Machine Learning (ACML), pp. 2-16 (Year: 2018).*
Zhang et al., "Adversarial Feature Matching for Text Generation", Nov. 18, 2017, pp. 1-10, https://doi.org/10.48550/arXiv.1706.03850 (Year: 2017).*
International Search Report and Written Opinion for PCT Application No. PCT/US2019/032665, mailed on Feb. 17, 2020, 24 pages.
Larsen, et al., "Autoencoding Beyond Pixels Using a Learned Similarity Metric", arXiv:1512.09300v2, Feb. 10, 2016, 8 pages.
Liang, et al., "Learning Noise-Invariant Representations for Robust Speech Recognition", 2018 IEEE Spoken Language Technology Workshop (SLT), Dec. 18, 2018, 8 pages.
Pascual, et al., "Segan: Speech Enhancement Generative Adversarial Network"; Interspeech 2017, arXiv1703.09452v3, Jun. 9, 2017, 5 pages.
Perarnau, et al, "Invertible Conditional Gans for Image Editing", Workshop on Adversarial Training, NIPS 2016, arXiv:1611. 06355v1, Nov. 19, 2016, 9 pages.
Borgwardt, et al., "Integrating Structured Biological Data by Kernel Maximum Mean Discrepancy", Bioinformatics, vol. 22, No. 14, 2006, pp. e49-e57.
Donahue, et al., "Exploring Speech Enhancement with Generative Adversarial Networks for Robust Speech Recognition", ICASSP, Oct. 31, 2018, 6 pages.
Erdogan, et al., "Phase-sensitive and Recognition-Boosted Speech Separation Using Deep Recurrent Neural Networks", IEEE International Conference on Acoustics, Speech and Signal Processing (ICASSP), 2015, pp. 708-712.
Gannot, et al., "Signal Enhancement Using Beamforming and Nonstationarity with Applications to Speech", IEEE Transactions on Signal Processing, vol. 49, No. 8, Aug. 2001, pp. 1614-1626.
Goodfellow, et al., "Generative Adversarial Nets", Advances in Neural Information Processing Systems, 2014, 9 pages.
Hines, et al., "VISQOL: The Virtual Speech Quality Objective Listener", International Workshop on Acoustic Signal Enhancement (IWAENC), Sep. 2012, 4 pages.
Hochreiter, et al., "Long Short-Term Memory", Neural Computation, vol. 9, No. 8, 1997, 32 pages.
Kleijn, et al., "Salient Speech Representations Based on Cloned Networks", Interspeech, Aug. 19, 2019, 5 pages.
Kleijn, et al., "Wavenet Based Low Rate Speech Coding", 2018 IEEE International Conference on Acoustics, Speech and Signal Processing (ICASSP), Dec. 1, 2017, 5 pages.
Kumar, et al., "Speech Enhancement in Multiple-Noise Conditions Using Deep Neural Networks,", Interspeech 2016, Sep. 2016, pp. 3738-3742.
Luo, et al., "Conv-TasNet: Surpassing Ideal Time-Frequency Masking for Speech Separation", arXiv:1809.07454v3, May 15, 2019, 12 pages.
Michelsanti, et al., "Conditional Generative Adversarial Networks for Speech Enhancement and Noise-Robust Speaker Verification", Interspeech 2017, Aug. 2017, 5 pages.
Mohammadiha, et al., "Supervised and Unsupervised Speech Enhancement Using Nonnegative Matrix Factorization", IEEE Transactions on Audio, Speech, and Language Processing, vol. 21, No. 10, Nov. 2013, pp. 12 pages.
Park, et al., "A Fully Convolutional Neural Network for Speech Enhancement", Interspeech 2017, Aug. 2017, pp. 1993-1997.
Zhao, et al., "Convolutional-recurrent Neural Networks for Speech Enhancement", 2018 IEEE International Conference on Acoustics, Speech and Signal Processing (ICASSP), May 2, 2018, 5 pages.
Qian, et al., "Speech Enhancement Using Bayesian Wavenet", Interspeech 2017, Aug. 2017, pp. 2013-2017.
Rethage, et al., "A Wavenet for Speech Denoising", 2018 IEEE International Conference on Acoustics, Speech and Signal Processing (ICASSP), Jan. 31, 2018, 11 pages.
Rix, et al., "Perceptual Evaluation of Speech Quality (PESQ)—A New Method for Speech Quality Assessment of Telephone Networks and Codecs", IEEE International Conference on Acoustics, Speech, and Signal Processing, Proceedings (Cat. No. 01CH37221), vol. 2, 2001, 4 pages.
Tolstikhin, et al., "Wasserstein Auto-Encoders", arXiv:1711. 01558v4, Dec. 5, 2019, 20 pages.
Valentini-Botinhao, et al., "Investigating RNN-based Speech Enhancement Methods for Noise-Robust Text-to-Speech", SSW, 2016, 7 pages.
Van Den Oord, et al., "WaveNet: A Generative Model for Raw Audio", SSW, vol. 125, Sep. 19, 2016, 15 pages.
Vincent, et al., "Performance Measurement in Blind Audio Source Separation", IEEE Transactions on Audio, Speech, and Language Processing, vol. 14, No. 4, 2006, 8 pages.
Wilson, et al., "Exploring Tradeoffs in Models for Low-Latency Speech Enhancement", 16th International Workshop on Acoustic Signal Enhancement (IWAENC), Nov. 16, 2018, 5 pages.
Wisdom, et al., "Differentiable Consistency Constraints for Improved Deep Speech Enhancement", 2019 IEEE International Conference on Acoustics, Speech and Signal Processing (ICASSP), Nov. 20, 2018, 5 pages.
Xu, et al., "A Regression Approach to Speech Enhancement Based on Deep Neural Networks", IEEE/ACM Transactions on Audio, Speech, and Language Processing, vol. 23, No. 1, Jan. 2015, pp. 7-19.
First Office Action (with English translation) for Chinese Application No. 201980055674.2, mailed Jul. 24, 2024, 37 pages.

* cited by examiner

IDENTIFYING SALIENT FEATURES FOR GENERATIVE NETWORKS

CROSS-REFERENCE TO RELATED APPLICATION

This application is a 35 U.S.C. § 371 National Phase Entry Application from International Patent Application No. PCT/US2019/032665, filed on May 16, 2019, entitled "IDENTIFYING SALIENT FEATURES FOR GENERATIVE NETWORKS", the disclosure of which is incorporated by reference herein in its entirety.

BACKGROUND

Generative networks, such as WaveNet, WaveRNN, and Generative Adversarial Networks, generate excellent results in audio/visual synthesis, such as speech synthesis and image generation. Such models have the property of being restricted to a manifold, or topological space. Thus, for example, WaveNet is restricted to producing natural speech, i.e., is restricted to a speech manifold. However, such systems have difficulty reproducing input outside the manifold. For example, non-speech sounds tend to result in phoneme errors as noise levels increase.

SUMMARY

Implementations provide an encoder that extracts salient features from an input. The salient features are more robust and less redundant and can function as an enhancement that makes a generative network robust to noise, which results in fewer artifacts and more realistic output. Salient features may also function as an efficient compression technique. Implementations train cloned encoders to identify the salient features of different, but equivalent, inputs. Implementations may use the salient features to condition a generative network. Implementations do not try to approximate a clean signal, such that the generative properties of the network are not restricted during conditioning. To train the encoders, implementations may generate several equivalent signals for a clean input signal. The equivalent signals share salient features with the clean input signal, but are modified from (e.g., are different from in some way) the clean signal. As used herein, a modified signal refers to any information added to a clean signal or to any changes to a clean signal that a designer deems acceptable. Therefore, a modified signal refers to noise, distortions (e.g., phase shifts, delays that modify the signal), artifacts, information outside a target manifold of the clean signal, etc., that modify the clean signal. Put another way, as used herein, a modified signal may be any change to the clean signal that is not regarded as salient to a human designer. Implementations train encoders to filter out (e.g., ignore) the information not regarded as salient from the set of equivalent inputs. The cloned encoders, which share weights, take different signals from the set of equivalent signals as input. The cloned encoders, all employ a global loss function that encourages equivalence in the salient features extracted by each of the cloned encoders and independence within the salient features extracted by an individual encoder. In some implementations, the global loss function may also encourage sparsity in the extracted salient features and/or may encourage the extracted features to map to a shared target signal. Implementations may use a set of cloned decoders that mirror the encoders to reconstruct the target signal from the extracted salient features. In some implementations, the system may extract twelve salient features per input. When used in inference mode, a trained encoder may extract salient features for a sequence of inputs and condition the generative network using the salient features.

According to one aspect, a method for identifying features for a generative network includes obtaining a set of inputs for each clean input in a batch of inputs, the set of inputs including at least one modified input, each modified input being a different modified version of the clean input. The method also includes training an encoder having weights to provide features for an input by, for each set of inputs in the batch of inputs, providing the set of inputs to one or more cloned encoders, each cloned encoder sharing the weights, and each of the one or more cloned encoders receiving a different respective input of the set of inputs, and modifying the weights to minimize a global loss function. The global loss function has a first term that maximizes similarity between features for the set of inputs and a second term that maximizes independence and unit-variance within the features generated by the encoder, the encoder being one of the one or more encoders. The method may include using the encoder to extract features for a new input and providing the extracted features to the generative network. The method may include compressing the features for the new input and storing the features.

According to one aspect, a method includes receiving an input signal and extracting salient features for the input signal by providing the input signal to an encoder trained to extract salient features. The salient features may be independent and have a sparse distribution. The encoder may be configured to generate almost identical features from two input signals a system designer deems equivalent. The method may include conditioning a generative network using the salient features. The method may include compressing the salient features.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for learning how to identify independent, salient features from an input, which can be used for conditioning a generative neural network, or for compression, substantially as shown in and/or described in connection with at least one of the figures, and as set forth more completely in the claims.

One or more of the implementations of the subject matter described herein can be implemented so as to realize one or more of the following advantages. As one example, implementations provide a new class of enhancement that conditions a generative network to focus on particular features, the salient features, in any input. Such conditioning makes the generative networks so conditioned robust to noise. As a result, the generative networks conditioned using the salient features produce more natural errors than errors resulting from generative networks not similarly conditioned. In addition, the generative networks conditioned using the salient features handle more distorted input signals without producing errors than other networks not similarly conditioned. For example, as noise levels increase in an input signal, a generative speech network conditioned using the salient features disclosed herein produces fewer errors and, if any errors are produced, produces natural sounding errors that stay in the speech manifold. In contrast, artifacts generated by other generative networks stray from the speech manifold and sound more unnatural, and therefore more noticeable, to listeners as noise level in the input increases.

As another example, salient features are compact. For example, implementations may extract a small number (e.g., ten or fewer, twelve or fewer, fifteen or fewer, twenty or fewer) of features from an input, but because the features represent salient, and therefore perceptually important, information and are independent from each other, a decoder can use the salient features to produce realistic output from the features. Put another way, salient features ignore features that are perceptually irrelevant but use significant memory allocation. This contrasts with most conventional encoders, such as variational autoencoders or VAEs, which fail to account for perceptual importance. Salient features can be used for the storage or transmission of signals, or for the manipulation of attributes of signals. For example, salient features may be used for robust coding of speech, encoding specific classes of images (e.g., human faces, handwriting, etc.), changing the identity of a speaker, resynthesizing a speech signal without noise, etc. While some previous methods have attempted to identify salient information, such previous methods require either explicit knowledge of the nuisance variables to be discarded or require pairs of equivalent signals for training; such methods do not scale as well as disclosed implementations.

As another example, disclosed implementations do not interfere with the generative nature of generative networks because implementations do not attempt to reconstruct the ground-truth, e.g., clean speech. Traditional enhancement metrics for evaluation use a reference and do not account for other solutions, which work well for networks like feed forward networks and recurrent neural networks, which try to find a good approximation of the clean speech waveform based on noisy observations and available prior knowledge. In contrast, generative networks (e.g., generative convolutional neural networks, generative deep neural networks, adversarial networks, etc.) are restricted to a manifold, or topological space. For example, generative speech networks are restricted to producing natural speech, and generative image networks are restricted to producing images. Generative networks can use a stochastic process to generate complex details that are perceptually irrelevant instead of trying to reproduce the input signal exactly. For example, in reproducing an image of a tree leaves should look correct (e.g., color, shape) but the leaves can vary in number or location from the original. In this example, the number and location are perceptually irrelevant. In other words, generative networks can provide a solution that differs considerably from the ground truth but that is equivalent to it. Current systems for enhancing generative networks are optimized at least in part to reconstruct the ground-truth input, which restricts the generative aspect of the generative network. In other words, traditional enhancement metrics do not account for these other solutions. Because disclosed implementations do not rely on reconstruction of the ground truth, disclosed implementations tend not to restrict the generative aspects and, therefore, tend to result in more natural or realistic output.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Implementations provide an enhancement to generative networks by learning to extract salient features from an input signal. Salient features are features that are shared by signals that are defined as being equivalent by a system designer. The system designer provides qualitative knowledge to the feature extraction. The qualitative knowledge enables the encoders to ignore features that are perceptually irrelevant (e.g., noise, pauses, distortions, etc., not affecting the meaning or content), extracting only those features that impact the content or meaning of the input. In other words, perceptually relevant features are features that affect the ability of humans to grasp the substance of the input and other features. Features that are perceptible but do not affect the substance are perceptually irrelevant. Thus, salient features can be described as perceptually important to humans. Such features may be small in number per input, but result in better, more realistic reconstruction, as perceived by a user.

Figure 1:
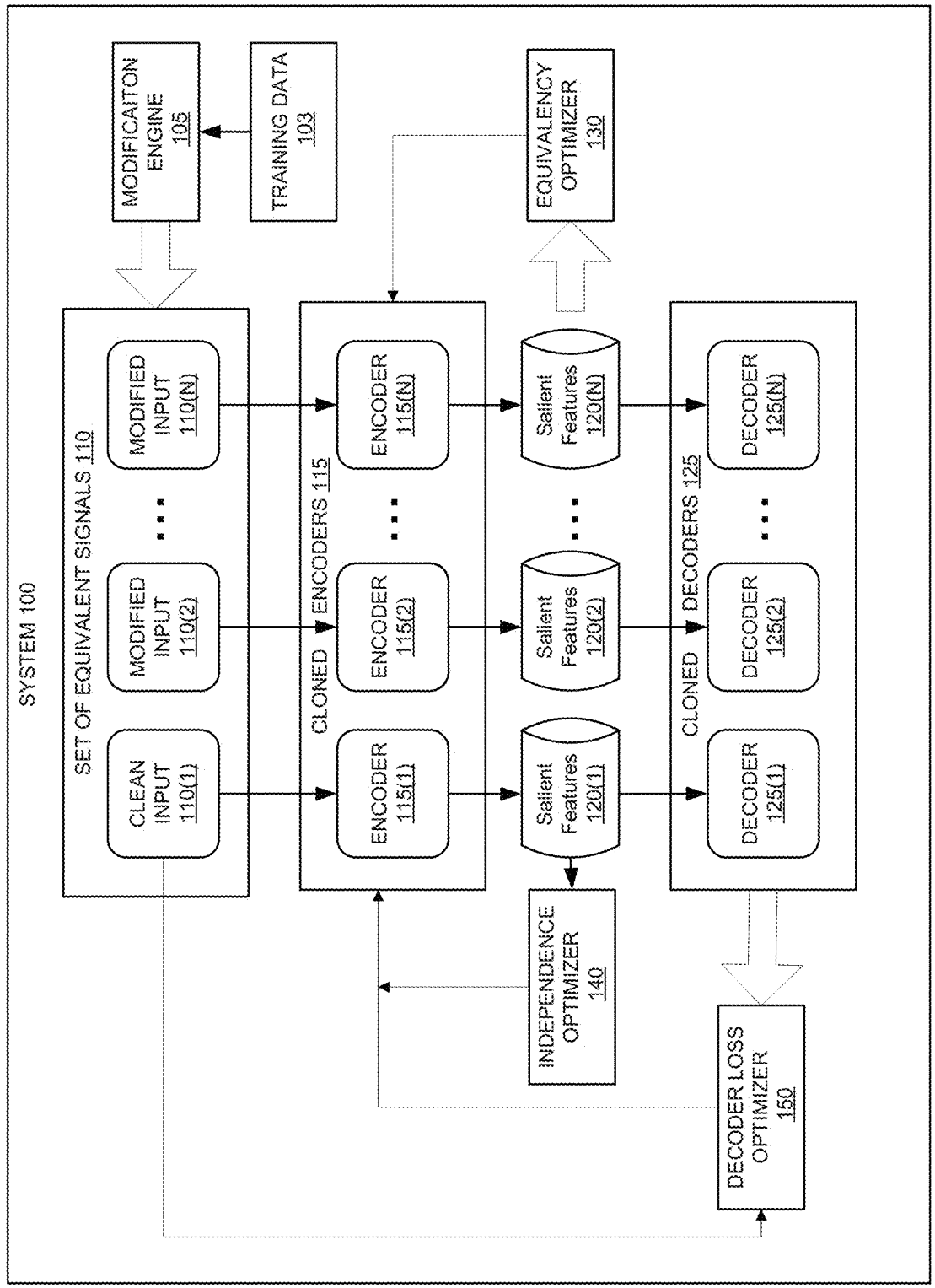
FIG. 1 illustrates an example system used for training a salient feature encoder, in accordance with the disclosed subject matter.

FIG. 1 is a block diagram of a salient feature extraction system in accordance with an example implementation. The system 100 may be used to train an encoder to extract salient features from an input. The salient features capture perceptually relevant features from the input signal in a scalable fashion. The salient features can be used to store or transport an encoded signal. The salient features can be used to condition a generative network. The salient feature extraction system 100 jointly trains a set of cloned encoders 115. Each encoder, e.g., 115(1), 115(2), . . . , 115(N), receives as input a different input signal, e.g., 110(1), 110(2), . . . , 110(N), from a set of equivalent signals 110. The objective function used by the cloned encoders 115 encourages the encoders (115(1) to 115(N)) to map their respective input to a set of unit-variance features that is identical across the cloned encoders 115. Training can be supervised or unsupervised. Conventionally, supervised training uses labeled input during training. As used herein, supervised training does not refer to this conventional technique. Instead, as used herein, supervised training refers to using a reconstruction target term as an additional optimization term during training. Thus, in supervised training, the system 100 includes cloned decoders 125 that maps the salient features to a shared target signal. For ease of description, the depiction of system 100 in FIG. 1 is sometimes described as processing speech input (e.g., mel-frequency spectra), but implementations are not so limited. For example, the system 100 of FIG. 1 can process image input, video input, music input, etc.

Figure 6:
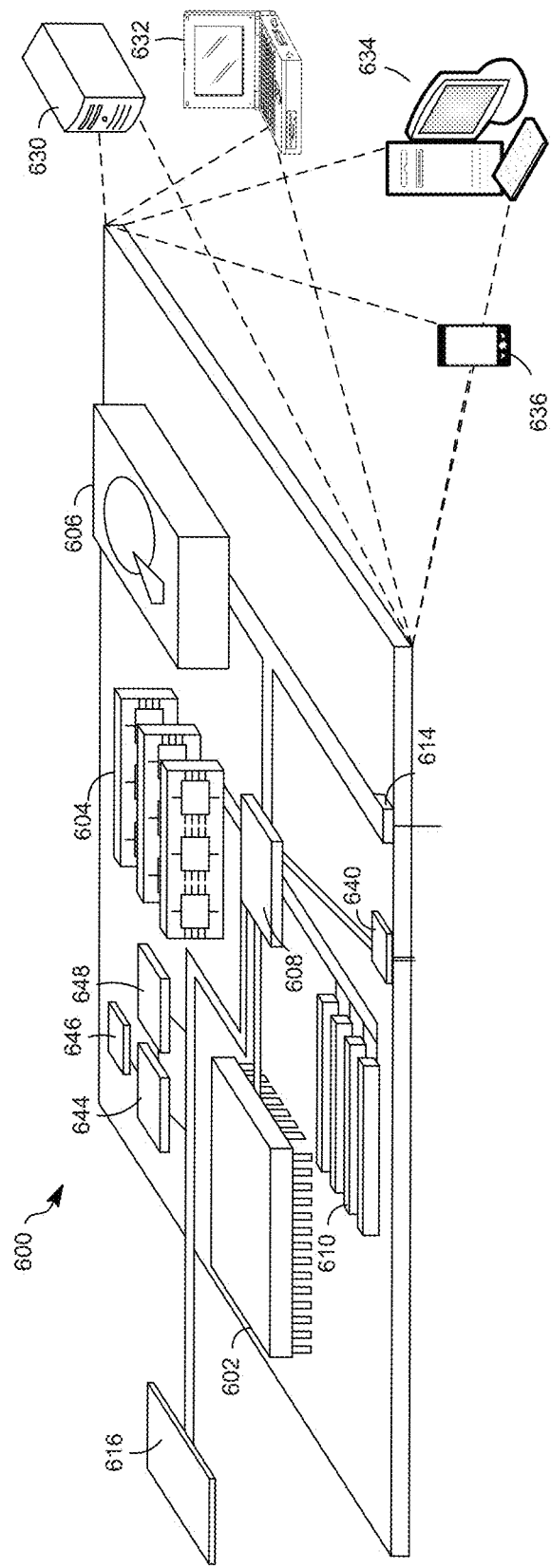
FIG. 6 shows an example of a computer device that can be used to implement the described techniques.
Figure 7:
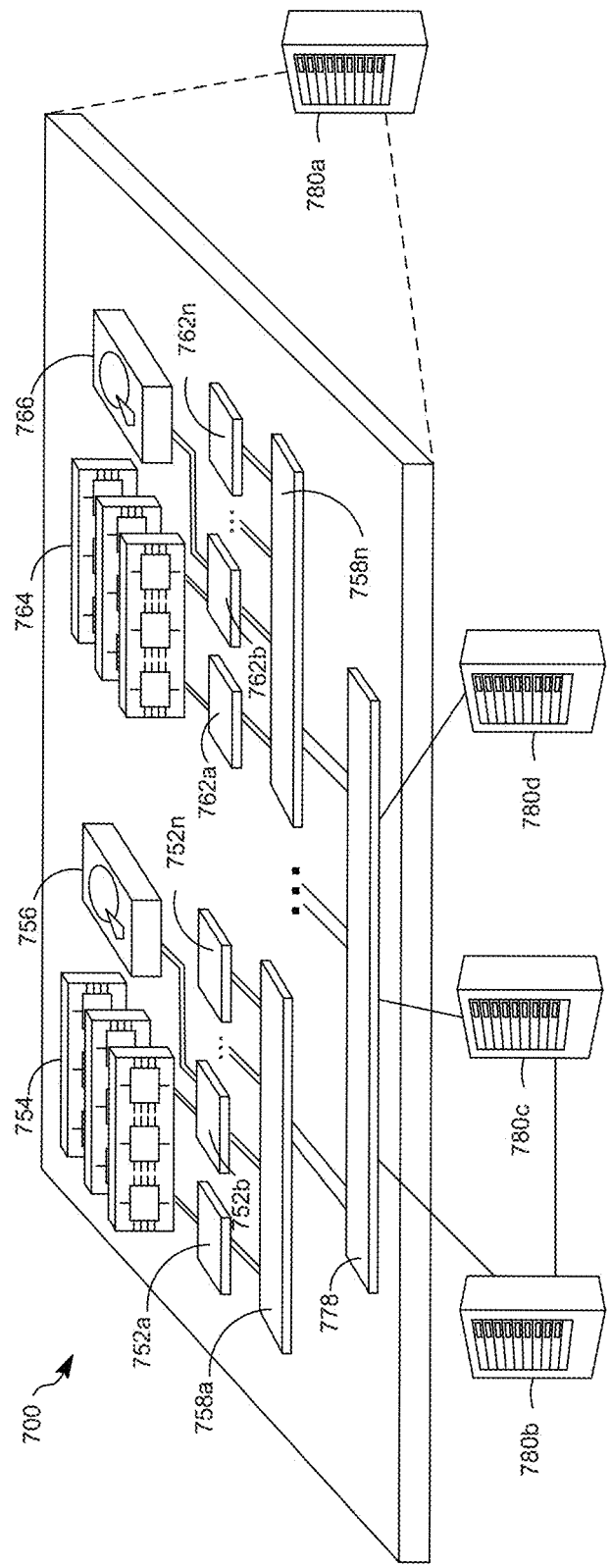
FIG. 7 shows an example of a distributed computer device that can be used to implement the described techniques.

The salient feature extraction system 100 may be a computing device or devices that take the form of a number of different devices, for example, a standard server, a group of such servers, or a rack server system, etc. In addition, system 100 may be implemented in a personal computer, for example, a laptop computer. The system 100 may be an example of computer device 600, as depicted in FIG. 6 or computer device 700, as depicted in FIG. 7.

Although not shown in FIG. 1, the system 100 can include one or more processors formed in a substrate configured to execute one or more machine executable instructions or pieces of software, firmware, or a combination thereof. The processors can be semiconductor-based—that is, the processors can include semiconductor material that can perform digital logic. The processors can be specialty processors, such as graphics processing units (GPUs). The system 100 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The cloned encoders 115 represents a plurality of machine-learned computational models or encoders. In machine learning, a computational model is organized as connected nodes, the nodes being organized into layers. The nodes perform a mapping function on provided input to produce some output. A first layer of nodes takes the input provided to the model, i.e., input from an outside source. The output of the first layer of nodes is provided as input to a second layer of nodes. The nodes in the second layer provide input to a subsequent layer, etc., until a final layer is reached. The final, or output, layer of nodes provides the output of the model. In the case of system 100, the output of the encoders is a feature vector. A vector is generally an array of numbers, with each position in the array representing a different attribute. The number of array positions is referred to as the dimension of the vector. The values in each array position can be a whole number or a decimal number. In some implementations, the value can represent a percentage, probability, likelihood, etc., of the attribute being present. In some implementations, the value can represent an actual value for the attribute. The layers can be fully connected or partially connected. In a fully connected model, each node in a layer sends its output to each node in the next layer. In a partially connected network, each node in a layer sends its output to some of the nodes in the next layer.

The function performed by the nodes on the input values maps the input to the output. The function uses parameters to perform the mapping. The mapping may be a surjective mapping. The model requires training to determine the parameters, which may start as random values. The parameters are also referred to as weights. For the purposes of this application, the weights may be expressed as $\psi$. The training process determines the optimal parameters using an objective function. The objective function identifies the goals of the mapping and helps the model modify the parameters through iterative training rounds until arriving at an optimal set of parameters. Once the optimal parameters are identified, the model is said to be trained and can be used in an inference mode. In an inference mode, the model uses the parameters to provide or predict an output from a given input. Each machine learned model is trained for a specific task, e.g., prediction, classification, encoding, etc. The task performed by the computational model is determined by the inputs provided, the mapping function, and the desired output.

In the example of FIG. 1, the cloned encoders 115 includes a plurality of encoders. Each encoder has its own layers and receives a separate input, but each encoder shares the same set of weights $\psi$ with the other encoders. Thus, during training, the weights $\psi$ are adjusted the same for all encoders in the cloned encoders 115. Because the encoders share weights, they may be referred to as clones. In other words, each encoder of cloned encoders effectively represent the same encoder and would, if given the same input produce the same features. However, during training each encoder of the cloned encoders 115 is given a different input, but each input is considered equivalent in substance to a system designer. The encoders of the cloned encoders 115 use the same objective function.

The inputs provided to the cloned encoders 115 represent equivalent signals. In some implementations, equivalent signals are signals deemed equivalent by a system designer. Thus, a system designer may select the types of modifications made to a clean input. In this sense, a system designer may oversee the generation of a set of equivalent input for processing. A clean input is any input that is modified to generate a set of equivalent signals. In general, the clean input represents an original file, desired output, etc. The set of equivalent signals 110 represents different modifications made to a clean signal. As used herein, modifications can include any modification to or information added to a clean signal that a designer deems acceptable. A modified signal can include noise or artifacts added to a clean signal. A modified signal can include distortions of a clean signal, such as all-pass filtering (i.e., relative delay of different frequency bands, phase shifts, etc.). A modified signal can include information outside a target manifold added to the clean signal. Put another way, a modification may be any modification made to an input not regarded as salient to a human designer. For example, if clean input 110(1) is a speech sample, modified input 110(2) may be the same speech sample with traffic noise added, modified input 110(3) may be a relative delay of a frequency band of the speech signal, modified input 110(4) may be the same speech sample with restaurant noise added, modified input 110(5) may be the same speech sample with reverberation added, input 110(6) may be the same speech sample with microphone distortions added, etc.

In some implementations, the system designer decides what kinds of modifications to make and then uses a modification engine 105 to apply the modifications to the clean signal and generate the set of equivalent signals 110. The modification engine? 105 may use training data 103 as the source of clean data. The modification engine 105 may use the training data 103 as a source of one or more of the modifications, e.g., to generate one or more of the modified inputs. For example, the training data can be a dataset of clean signals, e.g., a dataset of images, a dataset of speech data uttered by native speakers, professionally recorded music compositions, etc. In some implementations, the modification engine 105 may be configured to provide inputs within a signal to noise ratio (SNR) range. For example, if signals provided to the cloned encoders 115 are too noisy/modified too much, an objective function that minimizes reconstruction error may encourage removal of attributes that are salient (perceived by humans and relevant to comprehension and/or quality). On the other hand, if the noise is insufficient, the salient features may be more sensitive to noise. The number N of signals in the set of equivalent signals 110 is implementation dependent. Generally, the number depends on the type of modifications applicable to the input as well as the processing capabilities of the hardware of system 100, and training time. In some implementations the selection of N is a tradeoff between performance and quality. In some implementations the set of equivalent signals 110 may include 32 inputs (e.g., N=32).

Each of the encoders 115(1)-115(N) in the cloned encoders 115 receives a different one of the set of equivalent signals 110. The cloned encoders 115 includes one encoder for each different equivalent signal. For example, encoder 115(1) may receive a clean input 110(1), while encoder 115(2) receives a first modified input 110(2), etc.

The encoders in the cloned encoders 115 each use an objective function to learn the parameters (weights) that enable the encoders to extract a feature vector that is similar across all encoders despite the different inputs and includes information needed to reconstruct a representation of the clean input. The resulting extracted feature vectors, the salient features, generally lack information about the modifications and are therefore robust to the modifications. In an unsupervised learning implementation the objective function includes two terms. The first term encourages similarity across the salient features and the second term encourages independence and unit-variance. The second term may also encourage sparsity. In some implementations, the objective function may include a third term that encourages the cloned encoders 115 to find salient features that map to a shared target signal via a decoder, e.g., minimizing decoder loss. In some implementations, the decoder may be one of a set of cloned decoders. In some implementations, the second and optional third terms may be weighted. In some implementations, the objective function may be expressed as $D_{global} = D_E + \lambda_{MMD} D_{MMD} + \lambda_D D_D$ where $D_{global}$ is the global loss, which training attempts to minimize, $D_E$ is the first term that maximizes similarity between the salient features output by the cloned encoders, $D_{MMD}$ is the second term that maximizes independence, unit-variance, and optionally sparsity, $\lambda_{MMD}$ is a weighting factor applied to the second term, $D_D$ is the third term that encourages reconstruction of a target signal, and $\lambda_D$ is a weighting factor applied to the third term. The goal of training is to determine weights that get $D_{global}$ as close to zero as feasible. In some implementations, the system 100 defines the global loss as an expectation over the data distribution. In some implementations, the system 100 defines the global loss as an average over an observed batch of m data. In other words, the training occurs over a batch of m clean inputs and their respective sets of equivalent signals 110. The system 100 may use a stochastic gradient descent over the batch of m data points to optimize over the empirical distribution associated with the training data 103. The training data 103 may be any data consistent with the input that will be used in inference mode. In a speech domain, the input data may be a block or frame of speech. For example, the training data may be 40 ms of speech. The training data 103 may be a block (e.g., 20 ms, 40 ms) of speech converted to a spectral representation on a mel-frequency scale. In an image domain, the input data may be a block of pixel data. For example, the training data may be a 32×32 block of pixels. The training data 103 may be 40 ms of music, etc.

The first term of the objective function maximizes similarity among the salient features produced by the encoders of the cloned encoders 115. Similarity between the salient features extracted by the different encoders of the cloned encoders 115 can be maximized by minimizing the L2 norm (or square root of the squares), between the salient features generated by a first clone and the salient features generated by remaining clones (for reduced computational effort) or between the salient features generated by each clone and those generated by the remaining clones. For example, in some implementations the first term may be expressed as $$\sum_{i=1}^{m} \sum_{n=2}^{n=N} \left\| z_i^{(1)} - z_i^{(n)} \right\|^2,$$

where m is the number of inputs (sets of equivalent signals 110), N is the number of encoders in the cloned encoders 115, $\|\cdot\|$ is the L2 norm, and z represents the salient features extracted by an encoder, and i labels a particular feature. In other words, as an example, encoder 115(1) may extract features $z^{(1)}$, encoder 115(2) may extract features $z^{(2)}$, etc. for one of the m sets of equivalent signals 110. The salient features $z^{(1)}$ from the expression above are referred to as the reference features and the encoder that extracts $z^{(1)}$ from its respective input is the reference encoder. It is understood that any of the encoders in the cloned encoders 115 can be selected as the reference encoder. Accordingly, implementations are not limited to comparing the salient features from the clean signal (i.e., salient features 150(1)) to the other salient features (i.e., salient features 150(2) to 150(N)). Instead, any of salient features 150(1) to 150(N) can be selected as the reference features. Some implementations only compare the reference features to the remaining salient features to reduce computational effort.

In some implementations, the system 100 may compare all salient features for a set of equivalent signals 110 to all other salient features for the set of equivalent signals 110. In such implementations, each encoder becomes a reference encoder. In some implementations, a subset, e.g., two, three, five, of the encoders may be selected as reference encoders. In some implementations the system may minimize a 1-norm rather than an L2 norm. The L2 norm reduces the larger differences, which is a benefit in determining salient features, but implementations can use 1-norm. The first term of the objective function may be computed by an equivalency optimizer 130. The equivalency optimizer 130 may be configured to select features describing information components that are shared between the signals in the set of equivalent signals (e.g., input 110(1) to 110(N)) at relatively high fidelity. In some implementations, the equivalency optimizer 130 may calculate the L2 norm as outlined above. In some implementations, the equivalency optimizer 130 may calculate the 1-norm. The equivalency optimizer 130 may determine which weights $\psi$ to adjust to minimize the differences in the salient features produced for sets of equivalent signals.

The second term of the objective function, which maximizes independence and variance for the salient features, may be determined using any approach that encourages/forces the salient features to have a specified distribution. In other words, the system may force a specified distribution on the features. The specified distribution encourages independence and a given variance. Examples of such approaches include the chi-square test, the earth-moving distance reformulated via the Kantorovich-Rubinstein duality, and maximum mean discrepancy (MMD). MMD measures the distance between two distributions and requires a desired (specified) distribution for comparison. Example distributions include Gaussian, uniform, normal, Laplacian, etc. The choice of distribution determines sparsity. Gaussian and normal distributions do not encourage sparsity. A Laplacian distribution encourages sparsity. In a sparse vector, most of the dimensions have low values (e.g., a value close to zero) and only a few have large values. In some implementations, the system 100 may encourage the salient features to be sparse, e.g., with ten, twelve, fifteen, etc. large values among the dimensions. The dimension of a vector is the number of different attributes it represents.

The second term of the objective function, when using the MMD measure, may be expressed as $$\frac{1}{m(m-1)}\sum_{i \neq j}^{m}(k(z_i, z_j) + k(y_i, y_j)) - \frac{2}{m^2}\sum_{i,j}^{m,m}k(z_i, y_j),$$

where m is the number of batches (e.g., number of different sets of equivalent signals 110), $y_i$ is drawn from the selected distribution, $z_i$ is a set of salient features generated by a reference encoder, and $k(\cdot,\cdot)$ is a kernel with the desired scale and shape. In some implementations, the kernel is a multi-quadratic kernel. In some implementations, when using the MMD measure, the second term may be expressed as $$\frac{1}{M(M-1)}\sum_{i \neq j}k(z_i,z_j) - k(z_i, y_j) - k(z_j, y_i) + k(y_i, y_j).$$

For the MMD to perform correctly, m must be sufficiently large and depends on the desired precision. For example, m may be in the thousands. The reference encoder for the second term of the objective function can be the same encoder as the reference encoder used for the first term of the objective function. The reference encoder for the second term can be different than the reference encoder used for the first term. In some implementations, the system 100 may use more than one reference encoder. For example, the system may compare the salient features extracted by two, three, five, etc., different encoders to the distribution. The second term of the objective function may be computed by an independence optimizer 140 configured to measure the independence and variance as outlined above and to determine which weights ψ to adjust, for example, to minimize the difference between the distribution and a selected distribution. In some implementations, the second term may be weighted.

The third term of the objective function is an optional term that encourages the mapping of the different salient features to a shared target signal. In other words, the third term relates to the reconstruction of a target signal. The target signal may be derived from a clean signal (e.g., clean input 110(1)). The target signal may not attempt to approximate the clean signal directly. In some implementations, the target signal may characterize a short-term spectral characteristic of the clean signal. Such an implementation lowers the use of computational resources. In some implementations, the target signal may be one of the equivalent modified inputs. In some implementations, the target signal may be a representation of the clean signal with an appropriate criterion. For example, in a speech domain, a mel-spectrum representation of a clean speech signal with an L2 norm (i.e., squared error) can be used as the target signal. As another example, in a music domain, a mel-spectrum representation of a clean music signal with an L2 norm can be used as the target signal. As another example, in an image domain, a wavelet representation of a selected resolution may be used as the target signal. In some implementations, the target signal may be the clean signal.

The system 100 may use cloned decoders 125 to reproduce the target signal from the salient features. In some implementations, the cloned decoders 125 may have the same number of decoders as encoders in the cloned encoders 115. In such implementations, each decoder in the cloned decoders 125 receives a different one of the salient feature vectors, e.g., decoder 125(1) receives as input salient features 120(1), decoder 125(2) receives as input salient features 120(2), etc. In some implementations (not illustrated in FIG. 1), the cloned decoders 125 may include a single decoder. In some implementations, the cloned decoders 125 may have fewer cloned decoders than cloned encoders. The cloned decoders take as input salient features from an encoder and map the salient features to an output. The output represents a reconstruction of the input provided to the encoders. In some implementations, the configuration of the decoders may mirror the configuration of the encoders. For example, the encoders may each use two layers of Long Short-Term Memory (LSTM) nodes and one fully connected layer of nodes, each layer having 800 nodes and each of the cloned decoders may use one fully connected layer followed by two layers of LSTM, each with 800 nodes. As another example, the encoders may use four layers of LSTMs and two layers of fully connected nodes with the decoders mirroring this configuration. In some implementations, the decoders may not mirror the configuration of the encoders. The encoders are not limited to these exact configurations and can include feed forward layers, convolutional neural networks, ReLU activation, etc.

The cloned decoders 125 can include any suitable decoders. The cloned decoders 125 may be optimized by a loss function that employs an L2 norm. In some implementations, the third term may be expressed as $$\sum_{i=1}^{m}\sum_{n=1}^{N}\left\|f_\phi(z_i^{(n)}) - v_i\right\|^2,$$

where m is the number of sets of equivalent signals, N is the number of cloned encoders, $z_i^{(n)}$ is a salient feature vector generated by one of the cloned encoders, $v_i \in \mathbb{R}$ is a suitable signal representation for the clean input (i.e., the target signal), which has dimensionality P, $f_\phi: \mathbb{R}^Q \to \mathbb{R}^P$ is the cloned decoders network 125 with learned parameters ϕ that map a vector with dimensionality Q (e.g., $z_i^{(m)}$) to a vector of dimensionality P (e.g., $v_i$) and where summation is over the m sets of equivalent inputs. In some implementations, the number of cloned encoders (N) used to calculate the third term may be less than the number of cloned encoders 115. In some implementations, the third term may be weighted. In some implementations, the weight of the third term may be higher than the weight of the second term. For example, the weight of the third term may be 18.0 when the weight of the second term is 1.0. In some implementations, the weight of the third term may be zero. In such implementations, the training is unsupervised. The third term of the objective function may be computed by a decoder loss optimizer 150 configured to measure the similarity of the decoded output against a target signal as outlined above and to determine which weights ψ to adjust, for example, to minimize the difference between the reconstructed signals and the target signal. The parameters ϕ are also learned during training.

The system 100 may include or be in communication with other computing devices (not shown). For example, the other devices may provide the training data 103, the modification engine 105, and/or the sets of equivalent signals 110. In addition, the system 100 may be implemented in a plurality of computing devices in communication with each other. Thus, salient feature extraction system 100 represents one example configuration and other configurations are possible. In addition, components of system 100 may be combined or distributed in a manner differently than illustrated.

Figure 2:
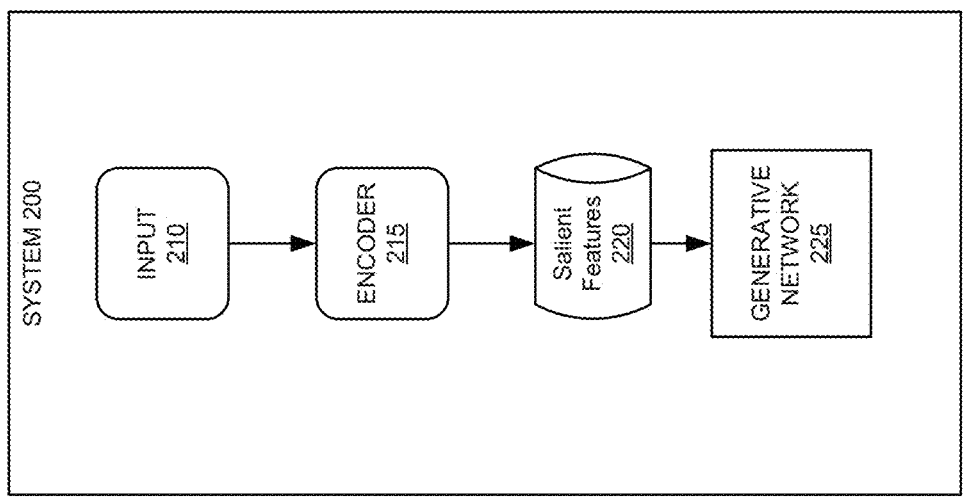
FIG. 2 illustrates an example system used for inference, in accordance with the disclosed subject matter.

FIG. 2 illustrates an example system 200 used for inference, in accordance with the disclosed subject matter. System 200 is one example of how salient features may be used. In the example of system 200, the salient features are used to condition a generative network 225. The system 200 is a computing device or devices that that take the form of a number of different devices, for example a standard server, a group of such servers, a rack server system, two computers in communication with each other, etc. In addition, system 200 may be implemented in a personal computer, for example a desktop or laptop computer. The system 200 may be an example of computer device 600, as depicted in FIG. 6 or computer device 700, as depicted in FIG. 7.

Although not shown in FIG. 2, the system 200 can include one or more processors formed in a substrate configured to execute one or more machine executable instructions or pieces of software, firmware, or a combination thereof. The processors can be semiconductor-based—that is, the processors can include semiconductor material that can perform digital logic. The processors can be specialty processors, such as graphics processing units (GPUs). The system 100 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 200.

The system 200 includes an encoder 215. The encoder 215 represents one of the encoders of the cloned encoders 115 of FIG. 1. In other words, the encoder 215 is a trained encoder, with weights $\psi$ that have been optimized to produce salient features 220 from a given input 210. As the encoders of the cloned encoders 115 share the same weights $\psi$, they are identical encoders and any encoder (115(1) to 115(N)) can be used as encoder 215 in inference mode. Put another way, as an encoder uses the weights to map an input to an output, and only one set of weights is used in the cloned encoders 115, the weights $\psi$ represent the encoder. Thus, weights $\psi$, determined by system 100, enable the encoder 215 to map the input 210 to salient features 220. The input 210 is a signal of the same format as the signals used to train the cloned encoders 115 of FIG. 1. For example, the input 210 may be a mel-frequency block of 40 ms of speech. The encoder 215 maps the input 210 to salient features 220. The system 200 may provide the salient features 220 to the generative network 225. In some implementations, the system 200 may compress and/or store the salient features 220 and transmit the features 220 to the generative network 225. The generative network 225 then uses the salient features 220 and the input 210 for conditioning. Conditioning is a method of providing features to the network 225 to produce specific characteristics. The salient features 220 provide better features for conditioning. In the example of system 200, the generative network 225 is conditioned to focus on the salient features of the input 210, which makes the network 225 robust to modifications, such as noise and distortions. Although not shown in FIG. 2, the system 200 in inference mode processes many different inputs as input 210. For example, system 200 may break a longer audio recording into frames, e.g., 20 ms or 40 ms, and process each frame in the recording as a separate input 210, providing respective salient features 220 for each input 210 for conditioning.

The system 200 is one example use of the salient features 220, but salient features may be used in other ways. For example, the salient features 220 may be used to store or transmit data in a compressed format. When salient features 220 are sparse, they may be compressed to a much smaller size and transmitted with less bandwidth than the original signal. A decoder, such as a decoder used in training the encoder, can regenerate the compressed salient features. Moreover, while FIG. 1 and FIG. 2 have been discussed in general with respect to speech, implementations are not so limited. For example, implementations can be adapted for use with input from image, music, video, etc., files.

Figure 3:
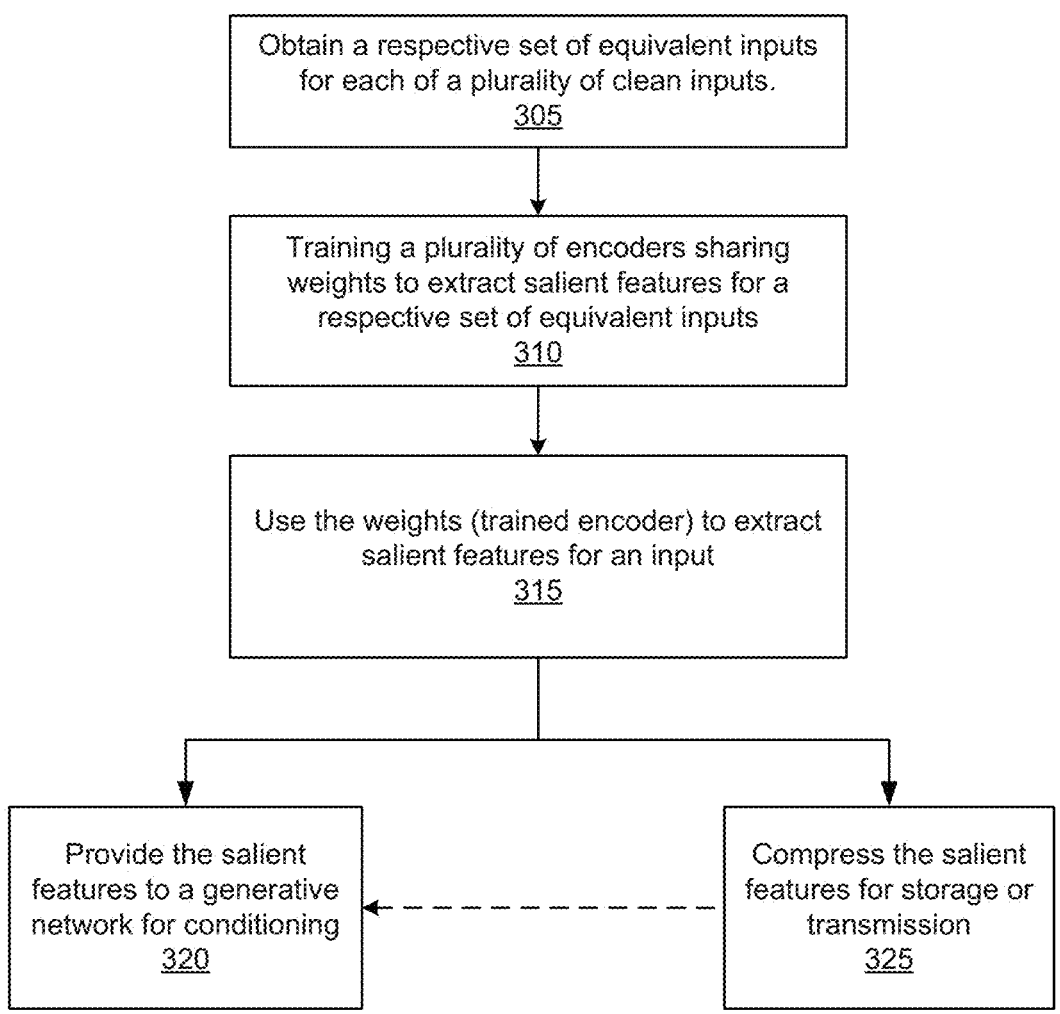
FIG. 3 is a flowchart of an example process for identifying and using salient features, in accordance with disclosed subject matter.

FIG. 3 is a flowchart of an example process for identifying and using salient features, in accordance with disclosed subject matter. Process 300 may be performed by a salient feature system, such as system 100 of FIG. 1 and system 200 of FIG. 2. Process 300 may begin by obtaining a set of inputs for a batch of clean inputs (305). The clean inputs may be from a database, e.g., a database of hundreds of hours of speech, an image library, etc. The clean inputs need not be clean in the conventional sense, just a signal for which equivalent signals are generated. In this sense a clean input represents one data point in a batch of data points. For each clean input, the system also obtains a number of equivalent inputs. A system designer may select the types of modifications made to the clean input to obtain an equivalent input. The system thus obtains a set of equivalent inputs. In some implementations, the set may include the clean input and the number of equivalent inputs. In some implementations, the set may not include the clean input, but is still referred to as associated with the clean input. The number of equivalent inputs is implementation dependent and is a trade off between training time, computational resources, and accuracy. Generally, less than 100 equivalent inputs are used. In some implementations, less than 50 equivalent inputs may be used. In some implementations, less than 20 equivalent inputs may be used. Each of the inputs in the set of equivalent inputs are based on the clean input. For example, different artifacts may be added to the clean signal. Different distortions may be made to the clean input. Different noise may be added to the clean input. In general, modified inputs are any modifications made to the clean input, but still deemed equivalent with the clean input, e.g., in terms of content and understanding. The cloned encoders learn to ignore this extra information. The system may train a set of cloned encoders, i.e., a plurality of encoders sharing weights, to extract salient features from a set of equivalent inputs (310). This process is described in more detail with regard to FIG. 4. Once the cloned encoders are trained, i.e., a set of optimized weights are determined, the weights represent a trained encoder, also referred to as a salient feature encoder. The system uses the salient feature encoder (i.e., using the optimized weights) to extract salient features for an input (315). The input is of a type similar to the training inputs used in step 305. The input may also be referred to as a conditioning input signal. In some implementations, the input signal may be parsed into several inputs, e.g., a plurality of time sequences of an audio file, a plurality of pixel blocks of a video file, etc. Each of the parsed components, e.g., each time sequence, may be used by the system as a separate input. The system may use the salient features and the conditioning input to condition a generative network (320) or for compression (325). In some implementations, the system may compress and store the salient features (325) before transmitting the features to the generative network for conditioning (320). Although shown in FIG. 3 as used for one input in step 315, the system may repeat step 315 and either of steps 320 or 325 any number of times. For example, the system may perform step 315 repeatedly for frames in a video or audio file or for blocks of pixels in an image file. Thus, it is understood that process 300 includes repeating step 315 and either of steps 320 or 325 with different input, as needed. Thus, this portion of process 300 can be used over a time sequence, over a large image, etc.

Figure 4:
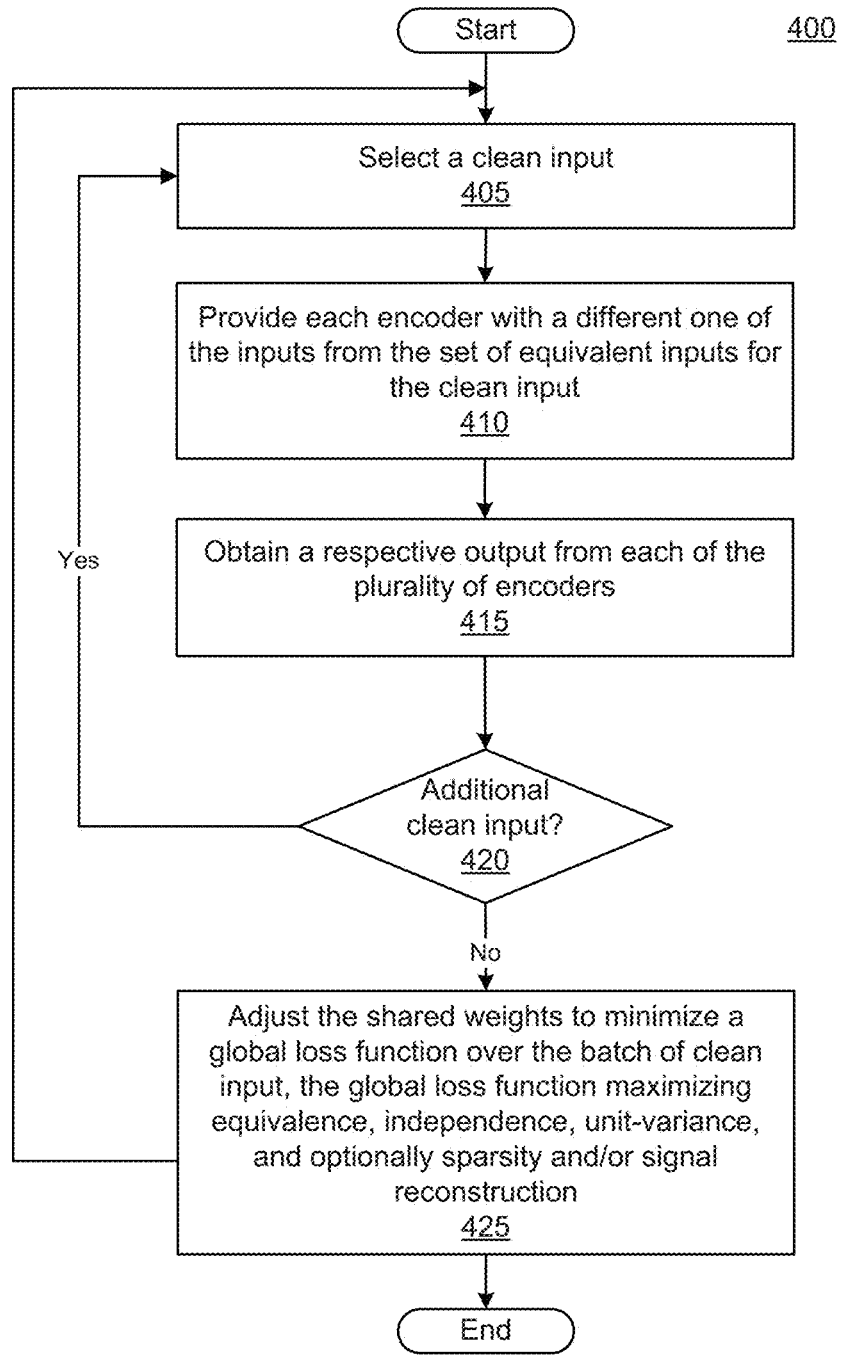
FIG. 4 is a flowchart of an example process for training an encoder to identify salient features, in accordance with disclosed subject matter.

FIG. 4 is a flowchart of an example process 400 for training an encoder to identify salient features, in accordance with disclosed subject matter. Process 400 may be performed by a salient feature system, such as system 100 of FIG. 1. Process 400 may begin with one of the clean inputs (405). The clean input represents a training data point. The training data may be a frame of an audio or video file, may be a specified time (e.g., 20 ms, 30 ms, 40 ms) of an audio or video file, may be a pixel block of a specified size from an image, etc. The clean input is associated with a set of equivalent inputs. The set of equivalent inputs includes the clean input and one or more modified inputs, as discussed with regard to step 305 of FIG. 3. The system provides each encoder of a set (plurality) of cloned encoders with a respective input from the set of equivalent inputs (410). Thus, each encoder in the set receives a different input from the set of equivalent inputs. The cloned encoders share weights. Each encoder provides an output based on the shared weights (415). The output of an encoder represents salient features for the respective input. The system may repeat the process of generating salient features for different clean input (420, yes) until a batch of clean input has been processed (420, no). The batch may have a size (e.g., m) sufficient to make a distribution measurement perform correctly. The system may then adjust the shared weights to minimize a global loss function that maximizes equivalence, independence, variance and optionally sparsity and/or signal reconstruction (425). The global loss function has a first term that maximizes similarity of the salient features extracted by each of the encoders for a set of equivalent inputs. Thus, each encoder is encouraged to extract the same features as the other encoders for a given set of equivalent inputs. The global loss function has a second term that maximizes independence and variance. The second term forces the salient features to have a particular distribution. The distribution can be a sparse distribution, e.g., encouraging sparseness in the salient features. The second term favors features that are disentangled. Some implementations may include a third term in the global loss function that ensures the salient features can be mapped to a target input. The target input may be derived from the clean input for the set of equivalent inputs. The target input may be the clean input. The target input may be any of the inputs in the set of equivalent inputs. The objective function is described in more detail with regard to FIG. 1. The system repeats process 400, with the newly adjusted weights, until convergence, e.g., the weights result in a mapping that minimizes the objective function to an acceptable degree, or until a predetermined number of training iterations has been performed. When process 400 completes, the optimal weights for the encoder has been determined and the weights can be used in inference mode.

Figure 5A:
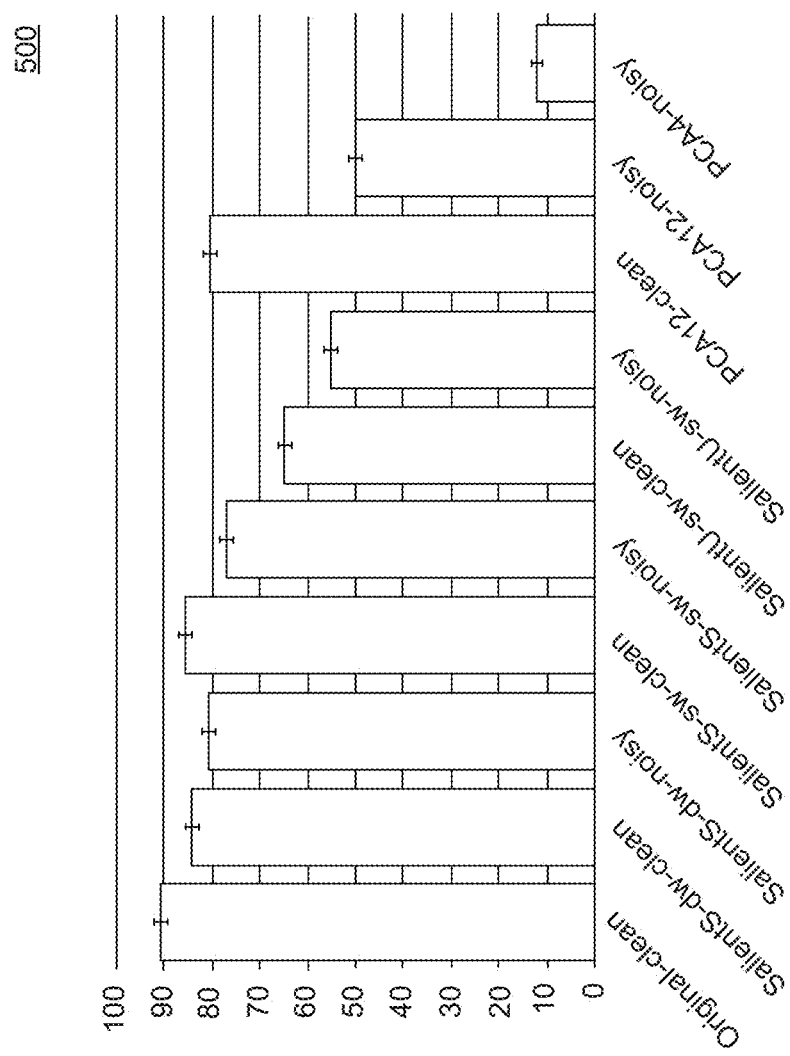
FIGS. 5A to 5C demonstrate benefits provided by disclosed implementations.
Figure 5B:
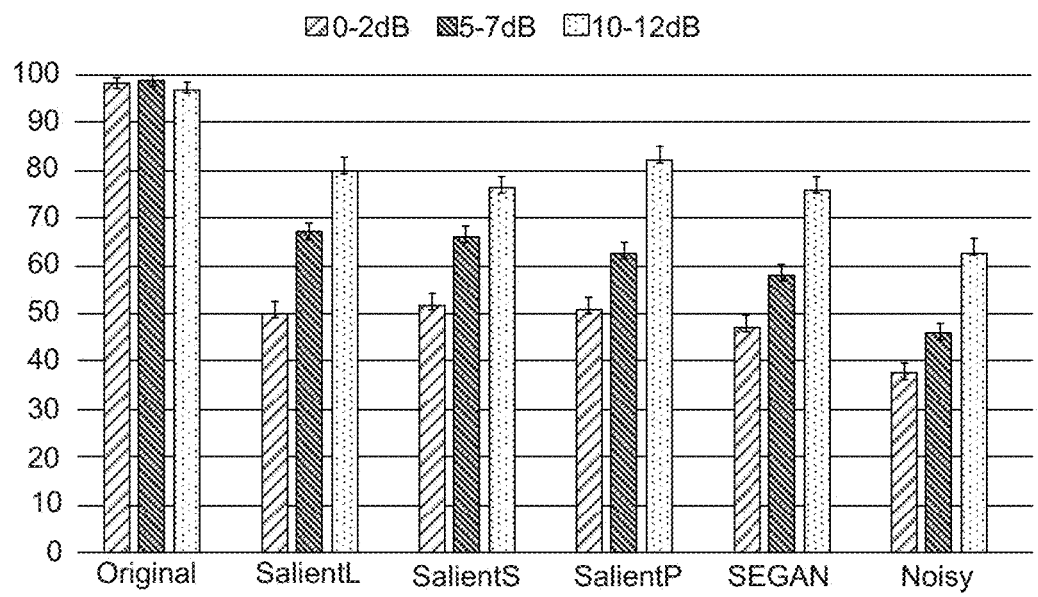
Figure 5C:
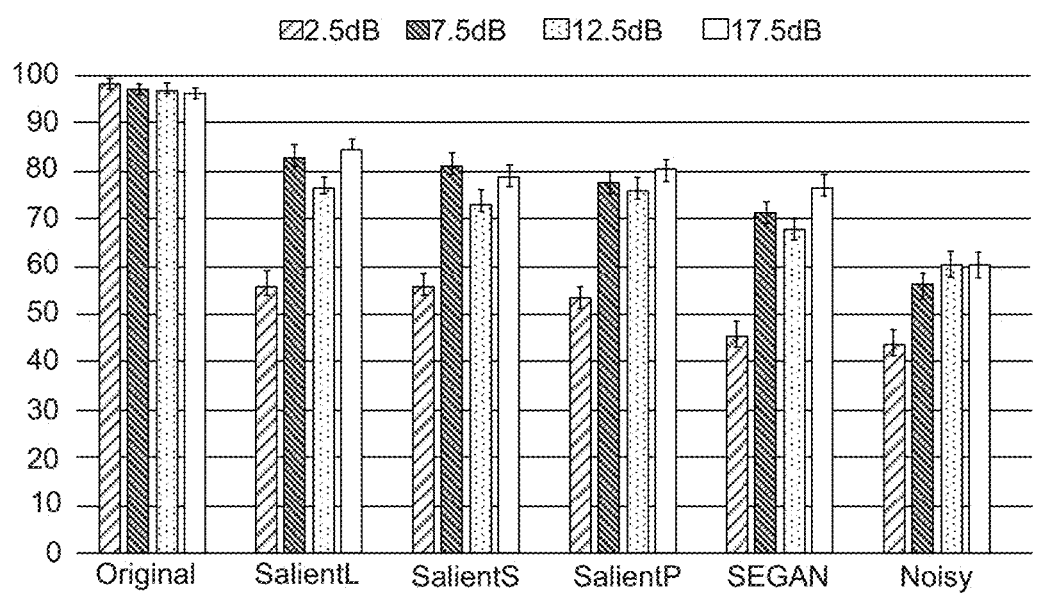

FIGS. 5A to 5C demonstrate benefits provided by disclosed implementations. FIG. 5A is a graph illustrating the listening test results for various implementations compared with conventional systems. In the example of FIG. 5A, the training database includes 100 hours of speech and 200 speakers and a mixed corpora of noise. The mixed corpora of noise includes stationary and non-stationary noise from approximately 10,000 recordings captured in a variety of environments, including busy streets, cafes, and pools. The input to the encoders of the cloned encoders is a set of equivalent inputs that included 32 different versions of a signal that contains an utterance. The set of equivalent inputs include the clean utterance and versions with noise additions from 0 to 10 dB signal to noise ratio (SNR).

In the example of FIG. 5A, the signals are preprocessed into an oversampled log mel spectrogram representation. In some implementations a single window (sw) approach is used. The single window (sw) approach uses 40 ms with a time shift of 20 ms and a resolution of the representation of 80 coefficients for each time shift. In some implementations, a dual window (dw) approach is used. In the dual window (dw) approach, each 20 ms shift is associated with one window of 40 ms and two windows of 20 ms, located at 5-25 and 15-45 ms of the 40 ms window. The 20 ms windows are described with 80 log mel spectrogram coefficients, for a total of 240 coefficients (dimensions) for each 20 ms shift. Implementations labeled SalientS use a decoder (supervised) during training. Implementations labeled SalientU use unsupervised training. When a decoder is used (supervised training), the mel spectrum of the clean signal is used as the target signal. Each implementation (e.g., supervised/unsupervised, sw/dw) are used to condition a different WaveNet. The conditioned WaveNet is provided with clean (-clean) and noisy (-noisy) inputs and the output is evaluated using a MUSHRA-like listening test.

The conventional systems illustrated in FIG. 5A as a reference use feature sets based on a principal component analysis (PCA) that extracts 12 features from the 240-dimensional vector of the dual window (dw) data. The PCA is computed for the signals that were used as input to the cloned encoders during training. A PCA that extracts four features is also illustrated.

FIG. 5A illustrates that the WaveNet conditioned using disclosed implementations are more robust to noise, significantly outperforming the reference system. More specifically, unsupervised learning with a single window (SalientU-sw) provides natural speech quality with good speaker identity but fairly frequent errors for phonemes of short duration. The number of errors is lower for the clean (SalientU-sw-clean) than for noisy (SalientU-sw-noisy) input signals. Supervised learning reduces the errors for noisy inputs for the clean input. For the noisy input the errors are further reduce by using the dual window, reaching almost the quality obtained with a clean input.

FIGS. 5B and 5C are graphs illustrating a comparison of disclosed implementations with other reference systems. FIG. 5B illustrates a comparison between various implementations and SEAGAN. FIG. 5C illustrates a comparison between various implementations and Denoising WaveNet. In the examples of FIGS. 5B and 5C, two sizes of models are used. A first implementation (SalientS and SalientP) has two layers of LSTM cells and one fully connected layer, each with 800 nodes. A second implementation (SalientL) has 4 layers of LSTMs and 2 layers of fully connected nodes, also with 800 nodes per layer. All implementations illustrated in FIGS. 5B and 5C use supervised training, with the decoders mirroring the encoder configuration. In the example implementations of FIGS. 5B and 5C, training processes a sequence from 16 kHz input of six 40 ms dual-window mel-frequency frames that overlap by 50 percent. Each of the dual window frames include 80 mel frequency bins from one window of 40 ms and two windows of 20 ms (located at 5-25 and 15-45 ms of the 40 ms window) for a total of 240 mel frequency bins per frame. The cloned encoders output, as the salient features, 12 values per frame with linear activation (e.g., 12 salient features per frame). The salient features are inferred on full utterances from the training set to create the conditioning training data for WaveNet, using the clean speech for teacher forcing and negative log-likelihood loss. The SalientL and SalientS examples are trained on the VoiceBank-DEMAND speech enhancement dataset (provided by Valentini et al.). In addition, a SalientP example is pre-trained on the WSJ0 dataset and switched to the VoiceBank-DEMAND mid-training.

FIG. 5B illustrates that in a listening test (MUSHRA-like) implementations match or exceed the performance for SEGAN. FIG. 5C illustrates that implementations outperform the denoised WaveNet at all SNR ranges. SEGAN and denoised WaveNet are examples of conventional systems that exploit a generative network but are at least in part optimized to reconstruct the ground-truth waveform, which restricts the generative aspect of the generative network. Thus, FIGS. 5B and 5C demonstrated that implementations, which do not try to reconstruct the ground truth, outperform such methods.

FIG. 6 shows an example of a generic computer device 600, which may be system 100 of FIG. 1 or system 200 of FIG. 2, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be system 100 of FIG. 1 or system 200 of FIG. 2, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

According to one aspect, a method for identifying features for a generative network includes obtaining a set of inputs for each clean input in a batch of inputs, the set of inputs including at least one modified input, each modified input being a different modified version of the clean input. The method also includes training an encoder having weights to provide features for an input by, for each set of inputs in the batch of inputs, providing the set of inputs to one or more cloned encoders, each cloned encoder sharing the weights, and each of the one or more cloned encoders receiving a different respective input of the set of inputs, and modifying the weights to minimize a global loss function. The global loss function has a first term that maximizes similarity between features for the set of inputs and a second term that maximizes independence and unit-variance within the features generated by the encoder, the encoder being one of the one or more encoders. The method may include using the encoder to extract features for a new input and providing the extracted features to the generative network. The method may include compressing the features for the new input and storing the features.

These and other aspects can include one or more of the following, alone or in combination. For example, providing the extracted features to the generative network may include decoding the compressed features and/or transmitting the features. As another example, the first term may measure a difference between features extracted from a first input of the set of inputs and features extracted from each remaining input from the set of inputs. As another example, the first term may measure a difference between features extracted from each input of the set of inputs and features extracted from each remaining input of the set of inputs. As another example, the second term may minimize maximum mean discrepancy between a specified distribution and a distribution of first features extracted by the encoder over the batch of inputs. In some implementations the specified distribution is a Laplacian distribution. In some implementations, the specified distribution is a Gaussian distribution. In some implementations, the second term may be expressed as $$\frac{1}{M(M-1)}\sum\nolimits_{i \neq j} k(z_i, z_j) - k(z_i, y_j) - k(z_j, y_i) + k(y_i, y_j),$$

where: M is a size of the batch, $k(\cdot,\cdot)$ is a kernel, z represents salient features for an input of the set of inputs, and y is drawn from the specified distribution.

As another example, the second term may further maximize sparsity within extracted features. As another example, the global loss function has the first term, the second term and a third term that maximizes similarity between a decoded input and a target input, the decoded input being a decoded version of extracted features. In some implementations, maximizing similarity between the decoded input and the target input includes providing the features produced by an encoder of the one or more cloned encoders to a decoder; and adjusting weights of the decoder to match the target input. In some implementations, the target input may characterize a short-term spectral characteristic of the clean input associated with the set of inputs. In some implementations, the decoder is one of one or more cloned decoders, the cloned decoders having a one-to-one relationship with the cloned encoders.

According to one aspect, a method includes receiving an input signal and parsing the input signal into a plurality of time sequences. The method also includes, for each time sequence of the plurality of time sequences, extracting features for the time sequence by providing the time sequence to an encoder trained to extract features as one of one or more cloned encoders. The cloned encoders share weights and minimize a global loss function during training. The global loss function maximizes similarity between the features output by each of the cloned encoders and maximizes independence, unit variance and sparsity within features generated by the encoder. The method may include compressing the extracted features. The method may include transmitting and/or storing the extracted features. The storage and/or transmission may be of the compressed features. The method may include conditioning a generative network using the features. The method may include decompressing the features and conditioning a generative network using the features.

These and other aspects can include one or more of the following, alone or in combination. For example, during training, each encoder of the cloned encoders may receive a respective input signal from a set of signals, each input signal from the set of signals representing a clean input signal or a different modification of the clean input signal. As another example, independence, unit variance, and sparsity may be maximized with a forced Laplacian distribution. As another example, the conditioned generative network may produce speech waveforms and the time sequence may include mel-frequency bins. In some such implementations, the conditioning results in the generative network producing artifacts within a speech manifold. As another example, the conditioned generative network may produce images.

According to one aspect, a method includes obtaining a set of inputs for each clean input in a batch of inputs, the set of inputs for a clean input including at least one modified input, each modified input being a different modified version of the clean input. The method also includes training an encoder having weights to generate features for each set of inputs in the batch of inputs. The training includes, for each set of inputs, providing a respective input from the set of inputs to one or more cloned encoders, the cloned encoders sharing the weights, wherein each of the one or more cloned encoders receives a different respective input of the set of inputs, and modifying the shared weights to minimize a global loss function. The global loss function may have a first term that maximizes similarity between features generated by the cloned encoders for the set of inputs and a second term that maximizes independence and unit-variance within the features generated by the encoder, the encoder being one of the one or more cloned encoders. The method may also include using the encoder to extract salient features for a new input.

These and other aspects may include one or more of the following, alone or in combination. For example, the method may include compressing the salient features extracted for the new input, and storing the compressed salient features extracted for the new input as a compressed input. In some implementations, storing the features can include transmitting the compressed features to a remote computing device, the remote computing device storing the compressed features. In some implementations, the remote computing device decompresses the features and generates a reconstructed input from the decompressed features using a decoder. As another example, the global loss function may include a third term that minimizes error in reconstructing a target input. In such implementations, the method may further include providing the features produced by the cloned encoders to a decoder and adjusting the shared weights of the encoder to minimize a reconstruction loss with the target input.

According to one aspect, a method includes receiving an input signal and extracting salient features for the input signal by providing the input signal to an encoder trained to extract salient features. The salient features may be independent and have a sparse distribution. The encoder may be configured to generate almost identical features from two input signals a system designer deems equivalent. The method also includes conditioning a generative network using the salient features. In some implementations, the method may also include extracting a plurality of time sequences from the input signal and extracting the salient features for each time sequence.

According to one aspect, a non-transitory computer-readable storage medium stores weights for a salient feature encoder, the weights having been determined through a training process that includes operations including minimizing, using cloned encoders sharing the weights, a global loss function having a first term and a second term for a batch of inputs, the batch of inputs being a plurality of sets of equivalent inputs, each cloned encoder receiving a different one of the sets of equivalent inputs. The first term of the global loss function maximizes similarity between output of the cloned encoders. The second term of the global loss function maximizes independence and variance between features in the output of at least one cloned encoder. A set of equivalent inputs may include a clean input and different modified versions of the clean input. These and other aspects can include one or more of the following, alone or in combination. For example, the output of each cloned encoder may be a sparse feature vector. In such implementations, the second term of the global loss function may maximize sparsity, e.g., by imposing (forcing) a Laplacian distribution. As another example, the global loss function may include a third term related to reconstruction of a target input. In such implementations, the third term may minimize differences between an output of a decoder and the target signal, the decoder receiving an output of a cloned encoder as input. The decoder may mirror the encoder.

According to one aspect, a system includes at least one processor, memory storing a plurality of cloned encoders, the encoders of the plurality of cloned encoders share weights, and a means for training the cloned encoders to produce a sparse feature vector from an input. In some implementations, the system may include a means for using an encoder employing the shared weights to generate sparse feature vectors from new input and condition a generative network using the sparse feature vectors. In some implementations, the system may include a means for using an encoder employing the shared weights to generate salient features for an input, a means to compress the generated salient features, and a means to store the salient features.

According to one aspect, a system includes at least one processor, a means for obtaining a conditioning input signal, a means for extracting sequences from the conditioning input signal, and a means for extracting salient features from each sequence. Some implementations may include a means for conditioning a generative network using the salient features. Some implementations may include a means for compressing the salient features and storing the salient features.

According to one aspect, a system includes at least one processor and memory storing instructions that, when executed by the at least one processor, cause the system to perform any of the methods disclosed herein.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for identifying features for a generative network, the method comprising:
   obtaining a set of inputs for each clean input in a batch of inputs, the set of inputs including at least one modified input, each modified input being a different modified version of the clean input;
   training an encoder having weights to provide features for an input by, for each set of inputs in the batch of inputs:
      providing the set of inputs to one or more cloned encoders, each of the one or more cloned encoders sharing the weights and receiving a different respective input of the set of inputs, the encoder being one of the one or more cloned encoders, and
      modifying the weights to minimize a global loss function, the global loss function having a first term that maximizes similarity between features for the set of inputs, a second term that maximizes independence and unit-variance within the features generated by the encoder, and a third term that minimizes a reconstruction loss with a target input, derived from the clean input, by mapping, via a decoder, the features generated by the encoder to an output representing a reconstruction of the input;
   using the encoder to extract features for a new input as extracted features;
   providing the extracted features to the generative network; and
   generating audio data or images data using the generative network.

2. The method of claim 1, wherein the first term measures a difference between features extracted from a first input of the set of inputs and features extracted from each remaining input from the set of inputs.

3. The method of claim 1, wherein the first term measures a difference between features extracted from each input of the set of inputs and features extracted from each remaining input of the set of inputs.

4. The method of claim 1, wherein the second term minimizes maximum mean discrepancy between a specified distribution and a distribution of first features extracted by the encoder over the batch of inputs.

5. The method of claim 4, wherein the specified distribution is a Laplacian distribution.

6. The method of claim 4, wherein the specified distribution is a Gaussian distribution.

7. The method of claim 4, wherein the second term is expressed as:

$$\frac{1}{M(M-1)}\sum_{i\neq j} k(z_i, z_j) - k(z_i, y_j) - k(z_j, y_i) + k(y_i, y_j),$$

where:
   M is a size of the batch of inputs, $k(\cdot,\cdot)$ is a kernel, z represents salient features for an input of the set of inputs, and y is drawn from the specified distribution.

8. The method of claim 1, wherein the second term further maximizes sparsity within extracted features.

9. The method of claim 1, wherein minimizing the reconstruction loss with the target input includes:
   providing the features produced by the encoder of the one or more cloned encoders to the decoder; and
   adjusting the weights to match the target input.

10. The method of claim 1, wherein the target input characterizes a short-term spectral characteristic of the clean input associated with the set of inputs.

11. The method of claim 9, wherein the decoder is one of one or more cloned decoders, the one or more cloned decoders having a one-to-one relationship with the one or more cloned encoders.

12. A method comprising:
   receiving an input signal;
   for each time sequence of a plurality of time sequences extracted from the input signal:
      extracting features for the time sequence as extracted features by providing the time sequence to an encoder trained to extract features as one of one or more cloned encoders, wherein the one or more cloned encoders share weights and minimize a global loss function during training, the global loss function maximizing similarity between the features extracted by each of the one or more cloned encoders; maximizing independence, unit variance, and sparsity within the features; minimizing a reconstruction loss with a target input, derived from the input signal, by mapping the features generated by the encoder to an output representing a reconstruction of the time sequence; and
      conditioning a generative network using the features; and
   generating artifacts using the generative network.

13. The method of claim 12, wherein, during training, each encoder of the one or more cloned encoders receives a respective input signal from a set of signals, each input signal from the set of signals representing a clean input signal or a different modification of the clean input signal.

14. The method of claim 12, wherein independence, unit variance, and sparsity are maximized with a forced Laplacian distribution.

15. The method of claim 12, wherein the artifacts include speech waveforms, and the time sequence includes mel-frequency bins.

16. The method of claim 15, wherein conditioning the generative network results in the generative network generating the artifacts within a speech manifold.

17. The method of claim 12, wherein the artifacts include images.

18. A method comprising:

obtaining a set of inputs for each clean input in a batch of inputs, the set of inputs for a clean input including at least one modified input, each modified input being a different modified version of the clean input;

training an encoder having weights to generate features for each set of inputs in the batch of inputs by, for each set of inputs:

provide a respective input from the set of inputs to one or more cloned encoders, the one or more cloned encoders sharing the weights and including the encoder, wherein each of the one or more cloned encoders receives a different respective input of the set of inputs, and modifying the weights to minimize a global loss function, the global loss function having a first term that maximizes similarity between features generated by the one or more cloned encoders for the set of inputs, a second term that maximizes independence and unit-variance within the features generated by the encoder, and a third term that minimize a reconstruction loss with a target input, derived from the clean input, by mapping, via a decoder, the features generated by the encoder to an output representing a reconstruction of the respective input;

using the encoder to extract salient features for a new input;

compressing the salient features extracted for the new input as compressed salient features;

storing the compressed salient features extracted for the new input as a compressed input;

conditioning a generative network using the salient features; and generating artifacts using the generative network.

19. The method of claim 18, wherein storing the compressed salient features includes:

transmitting the compressed salient features to a remote computing device, the remote computing device storing the compressed salient features.

20. The method of claim 19, wherein the remote computing device is configured to:

decompresses the salient features as decompressed salient features, and generate a reconstructed input from the decompressed salient features.

21. The method of claim 18, further comprising:

providing the features produced by the one or more cloned encoders to the decoder; and adjusting the shared weights of the encoder to minimize the reconstruction loss with the target input.

* * * * *

UNITED STATES PATENT AND TRADEMARK OFFICE
CERTIFICATE OF CORRECTION

PATENT NO. : 12,242,567 B2
APPLICATION NO. : 17/250506
DATED : March 4, 2025
INVENTOR(S) : Kleijn et al.

Page 1 of 1

It is certified that error appears in the above-identified patent and that said Letters Patent is hereby corrected as shown below:

In the Claims

In Column 24, Claim 21, Line 23, delete "the shared weights of the encoder" and insert -- the weights --, therefor.

Signed and Sealed this
Fifteenth Day of April, 2025

Coke Morgan Stewart
*Acting Director of the United States Patent and Trademark Office*